United States Patent
Inoue et al.

(10) Patent No.: US 6,836,541 B2
(45) Date of Patent: Dec. 28, 2004

(54) COMMUNICATING APPARATUS

(75) Inventors: Yutaka Inoue, Tokyo (JP); Toshio Kenmochi, Kanagawa (JP); Michihiro Izumi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 589 days.

(21) Appl. No.: 09/875,985

(22) Filed: Jun. 8, 2001

(65) Prior Publication Data

US 2002/0009187 A1 Jan. 24, 2002

(30) Foreign Application Priority Data

Jun. 12, 2000 (JP) ........................................ 2000-175102

(51) Int. Cl.[7] .......................... H04M 1/64; H04M 3/53; H04M 3/58; H04M 7/00
(52) U.S. Cl. ............................. 379/212.01; 379/88.26; 379/230
(58) Field of Search ....................... 379/201.01, 207.04, 379/211.02, 212.01, 88.26, 93.01, 230

(56) References Cited

U.S. PATENT DOCUMENTS

| | | | | |
|---|---|---|---|---|
| 5,095,504 A | * | 3/1992 | Nishikawa et al. | 379/162 |
| 5,602,910 A | * | 2/1997 | Tsutsui et al. | 379/212.01 |
| 5,768,356 A | * | 6/1998 | McKendry et al. | 379/242 |
| 6,026,155 A | * | 2/2000 | Takeuchi et al. | 379/212.01 |
| 6,442,266 B1 | * | 8/2002 | Wu | 379/211.02 |

* cited by examiner

Primary Examiner—Harry S. Hong
(74) Attorney, Agent, or Firm—Fitzpatrick, Cella, Harper & Scinto

(57) ABSTRACT

In a communicating apparatus which accommodates a plurality of channels, a message from a sender can be recorded even if a transfer station is busy (a telephone is being employed) or is located at a place where a radio wave does not reach. The communicating apparatus is able to detect a specified signal, such as a tone signal like DTMF or the like, which is transmitted from the sender upon a call transfer. When the specified signal is received, the communication apparatus suspends the transfer of the call and stores a message from the sender using a message recording function of the communicating apparatus.

2 Claims, 6 Drawing Sheets

COMMUNICATING APPARATUS

BACKGROUND OF THE INVENTION

1. Field of the Invention

The invention relates to a communicating apparatus which is connected to a plurality of channels such as ISDN and the like and, more particularly, to a communicating apparatus which transfers a call by using an unoccupied line upon set-up of a call and records a message by substituting when the call cannot be received because a transfer station is busy or the like.

2. Related Background Art

In association with the development of recent information communication, digitization of a telephone line is being progressed. The digital line is a line network called, for example, ISDN and is a line having features such that a plurality of channels can be logically accommodated and an information transfer speed is higher than that of a conventional analog public line and the like.

Owing to the recent Internet boom, the introduction of personal computers into general homes is progressing, a request for the simultaneous use of personal computer communication and a telephone and a request for improvement of a speed in the personal computer communication are increased, and the ISDN is rapidly being spread to general homes.

When the ISDN is introduced to the general homes, a form such that the telephone and the personal computer are connected to the line by using an apparatus called TA (terminal adapter) is a mainstream. In this case, a telephone for a general analog public line is connected as a telephone which is used.

In recent years, a digital telephone with an answer/record function which is directly connected to the ISDN network has also been put into practical use.

A set-up of transfer of an incoming call will now be described.

The "set-up of transfer of an incoming call" is the operation for transferring a received call to another partner side. As a type of transfer mentioned above, there are two kinds of transfers, a speech transfer and a message transfer.

The "speech transfer" is a transfer such that the received call is transferred as it is in a real-time manner and communication (conversation) is directly made between the transmission side and a transfer station. The "message transfer" is a transfer such that the call is once accepted, a message of a sender is recorded, the call is disconnected, a call is newly transmitted to a transfer station, and the recorded message is sent to the transfer station.

To realize the speech transfer by the conventional analog line, it is necessary to use toll transfer services on the line network side.

The message transfer is a transfer which is performed in the answer/record telephone of the general analog line and since the line which can be used is a single line, there is a problem such that messages which can be transferred are limited to the stored messages.

On the other hand, since a plurality of channels can be accommodated in the ISDN, a terminal apparatus can execute the speech transfer such that the call is received by a first channel and the received call is transferred by an unoccupied second channel.

In the speech transfer by the ISDN, in case of the TA connection, the TA itself has a transfer function, and in case of the digital telephone connection, the telephone itself has such a function. Even in the ISDN, although the set-up of call transfer function has been prepared as a service with charge on the network side, if the TA or digital telephone having the transfer function is prepared, there is no need to join the services on the network side and it is economical.

When the set-up of call transfer at an ISDN terminal is used, there is a case where a phone number of a cellular phone is set as a transfer station. In recent years, since a cellular phones become cheap, they are explosively spread owing to their convenience and the frequency of designating a cellular phone as a transfer station is increasing more and more.

When a cellular phone is designated as a transfer station as mentioned above, since a wireless zone exists unlike the transfer to a general wired telephone, there is a case where the call cannot be received in dependence on a situation of a radio wave besides a situation such that the telephone is occupied. When the call cannot be received due to the situation of the radio wave or the like, that is, if the call cannot be received for a predetermined time, a message showing that the telephone is not available is generated ordinarily. At this time, since a sender listens to the message and recognizes a fact that a partner side cannot receive the call, there is a problem such that the sender cannot help hanging up the telephone and a message which the sender wants to give cannot reach the partner side.

SUMMARY OF THE INVENTION

In a communicating apparatus which accommodates a plurality of channels, it is an object of the invention to provide a communicating apparatus which can record a message of a sender even when a transfer station (partner side) is busy (a telephone line is occupied) or located at a place where a radio wave does not reach.

DETAILED DESCRIPTION OF THE PREFERRED EMBODIMENT

Figure 1:
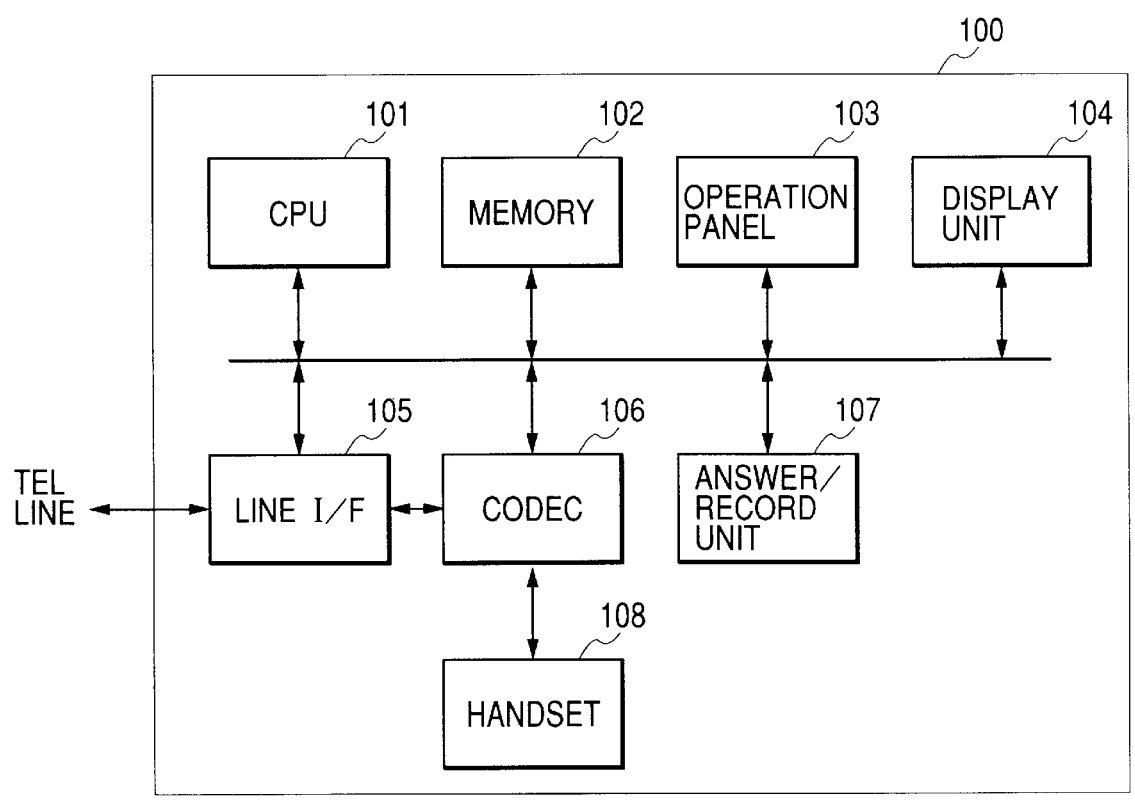
FIG. 1 is a block diagram showing a schematic construction of a communicating apparatus 100 according to an embodiment of the invention.

FIG. 1 is a block diagram showing a schematic construction of a communicating apparatus 100 according to an embodiment of the invention.

The communicating apparatus 100 comprises: a CPU 101 for controlling a system; a memory 102 for storing a program and data; an operation panel 103 for inputting a phone number or the like; a display unit 104 for displaying the phone number and a situation of the apparatus; an interface 105 which is connected to a line having a plurality of channels and corresponds to an ISO layer 1 interface in case of the ISDN; a codec (PCM codec in case of the ISDN) 106 which is connected to a handset 108 and encodes or decodes a voice or speech; an answer/record unit 107 for recording an answer message, a speech message, or the like; and the handset 108.

The operation of the communicating apparatus 100 will now be described.

Figure 2:
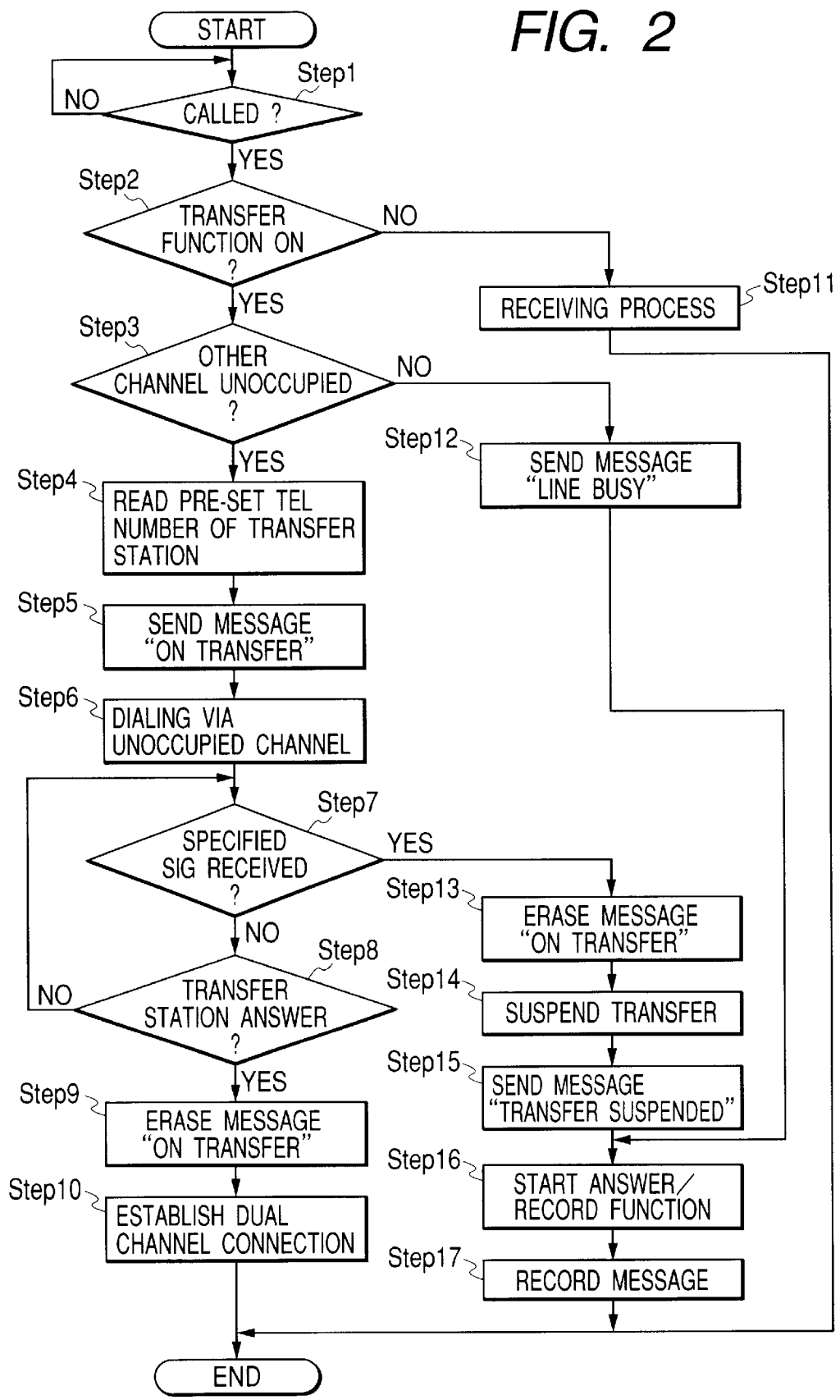
FIG. 2 is a flowchart showing the operation of the communicating apparatus 100.

FIG. 2 is a flowchart showing the operation of the communicating apparatus 100.

First, whether there is an incoming call or not is detected (step 1). If YES, whether the transfer is set or not (the transfer function is ON or not) is discriminated (step 2). The transfer is previously set, for example, by a user by means of the operation panel 103 of the communicating apparatus 100. A transfer button or the like can be also provided on the operation panel 103. If the transfer is not set, the processing advances to a usual call reception (step 11). Or, if the answer/record function is ON and the call cannot be received for a predetermined period of time, there may be a case where the processing routine advances to the answer/record function in step 16.

Each status in the embodiment will now be individually explained.

(Status 1: a case where all of the channels other than the channel used by the incoming call are busy)

If the transfer is set in step 2 shown in FIG. 2, an unoccupied situation of each of the plurality of accommodated channels is checked (step 3). That is, in case of the ISDN, an unoccupied situation of the other speech channel (B channel) is checked. If the other B channel (second channel) is occupied, a message showing that the channel is occupied and the transfer is impossible is sent to the sender by using a message transmission function (in many cases, it is included in the answer/record unit 107) (step 12). The answer/record function is started (step 16). The message of the sender is recorded (step 17).

The ISDN has two accommodated channels here and is generally called INS64. In this case, the ISDN has two channels (two B channels: that is, a B1 channel and a B2 channel) for speech and a control channel (D channel) for controlling a call and is constructed by (2B+D) channels.

Figure 3:
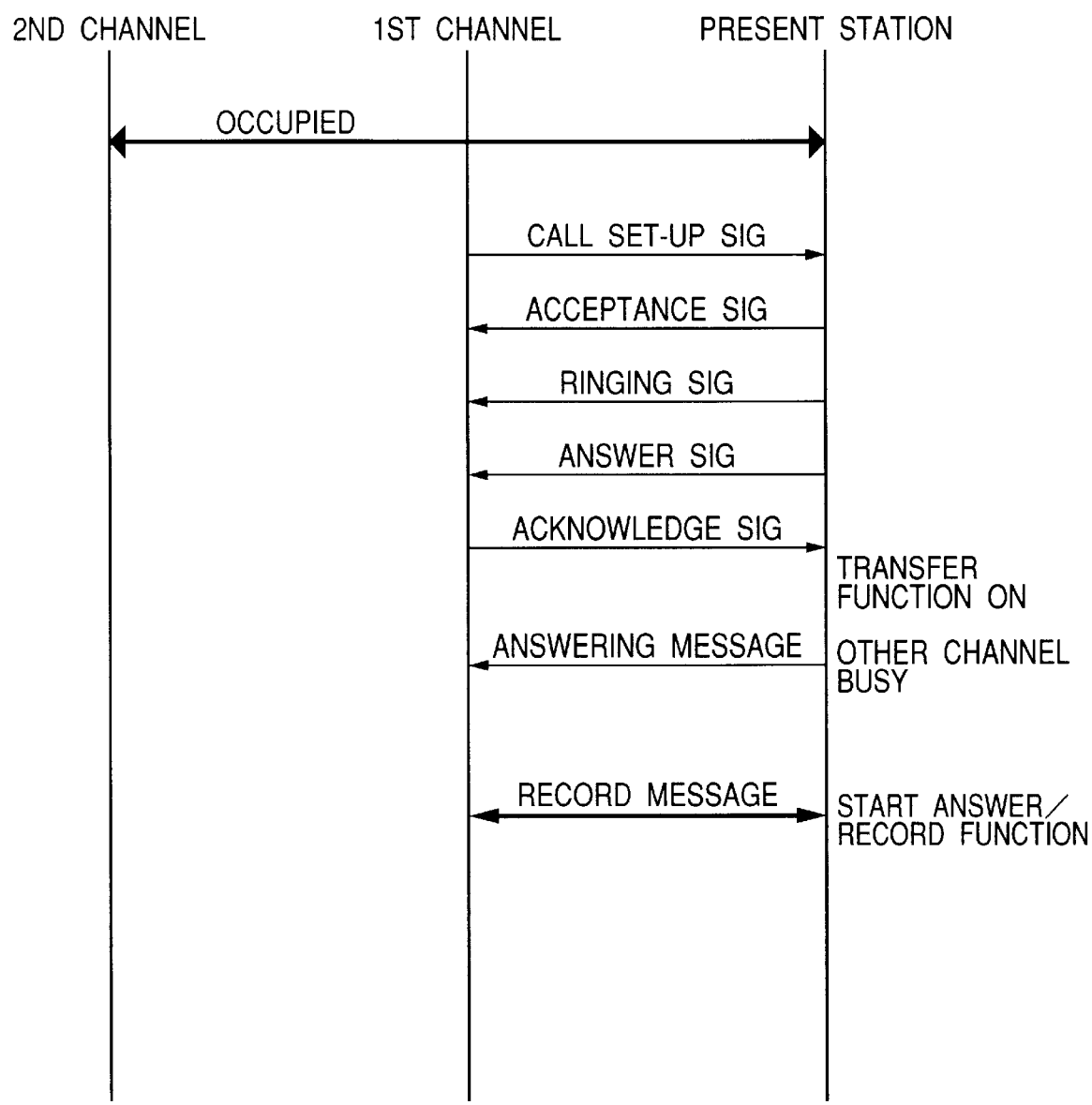
FIG. 3 is a diagram showing a series of processing sequence in the case where an ISDN (INS64) line is used in the above embodiment.

FIG. 3 is a diagram showing a series of processing sequence in case of using the ISDN (INS64) channel in the embodiment.

FIG. 3 shows an example in the case where when the second channel (for example, B2 channel) is occupied, a call is received from the first channel (for example, B1 channel).

In case of the ISDN, signals such as a call set-up signal or the like are transmitted or received by using the control channel (the D channel). The call set-up signal is received from the first channel as the D channel.

In the status 1, since the communicating apparatus 100 can receive the call, it returns a call set-up acceptance signal to the D channel and, subsequently, returns a ringing signal corresponding to a ring-back of the analog telephone. After that, the communicating apparatus 100 generates an answer signal corresponding to an off-hook of the analog telephone and receives an answer acknowledge signal from a partner station (a transmitter station), thereby completing the call set-up. The communicating apparatus 100 checks a use situation of the other channel (the second channel). That is, for example, a flag or the like indicative of the use situation of the main body is provided and a utilization situation of resources of the communicating apparatus 100 is monitored through this flag. If it is determined by this monitoring that the other channel (the second channel) is occupied and if the transfer is set by the transfer setting means, dialing cannot be performed to the second channel. Therefore, since the message cannot be transferred to a communication partner station (a destination), a message to promote record of the message (for example, a message such as "I am absent now. Please leave a message after a dial tone." or the like) is generated and the recording of the message of the partner station who dialed by using the first channel is started.

(Status 2: a case where the other channel can be used and a message can be transferred)

If it is determined in step 3 shown in FIG. 2 that the other channel is unoccupied, a phone number of a transfer station which has been preset in the main body of the communicating apparatus 100 is read out and a message showing that the message is being transferred (for example, a message such as "The message will be transferred. Please wait for a little while. If you want to suspend the transfer, press #1." or the like) is outputted by using the message transmission function (step 5).

Subsequently, the dialing is performed via the unoccupied channel on the basis of the phone number read out in step 4 (step 6). Whether a predetermined specified signal has been received from the transmitter station or not is discriminated (step 7). If the specified signal is not received, whether the transfer station has answered (received the call) or not is discriminated (it is discriminated by detecting an answer signal of the transfer station) (step 8). If the answer is acknowledged, a message "on transfer" is erased (step 9), the channel on the transfer source side is connected to the channel of the transfer station (step 10), and the speech is started.

The specified signal is, for example, a tone signal such as DTMF or the like which is ordinarily used on telephone (DTMF sound of "#1" in accordance with the foregoing message indicating "on transfer") or the like.

Figure 4:
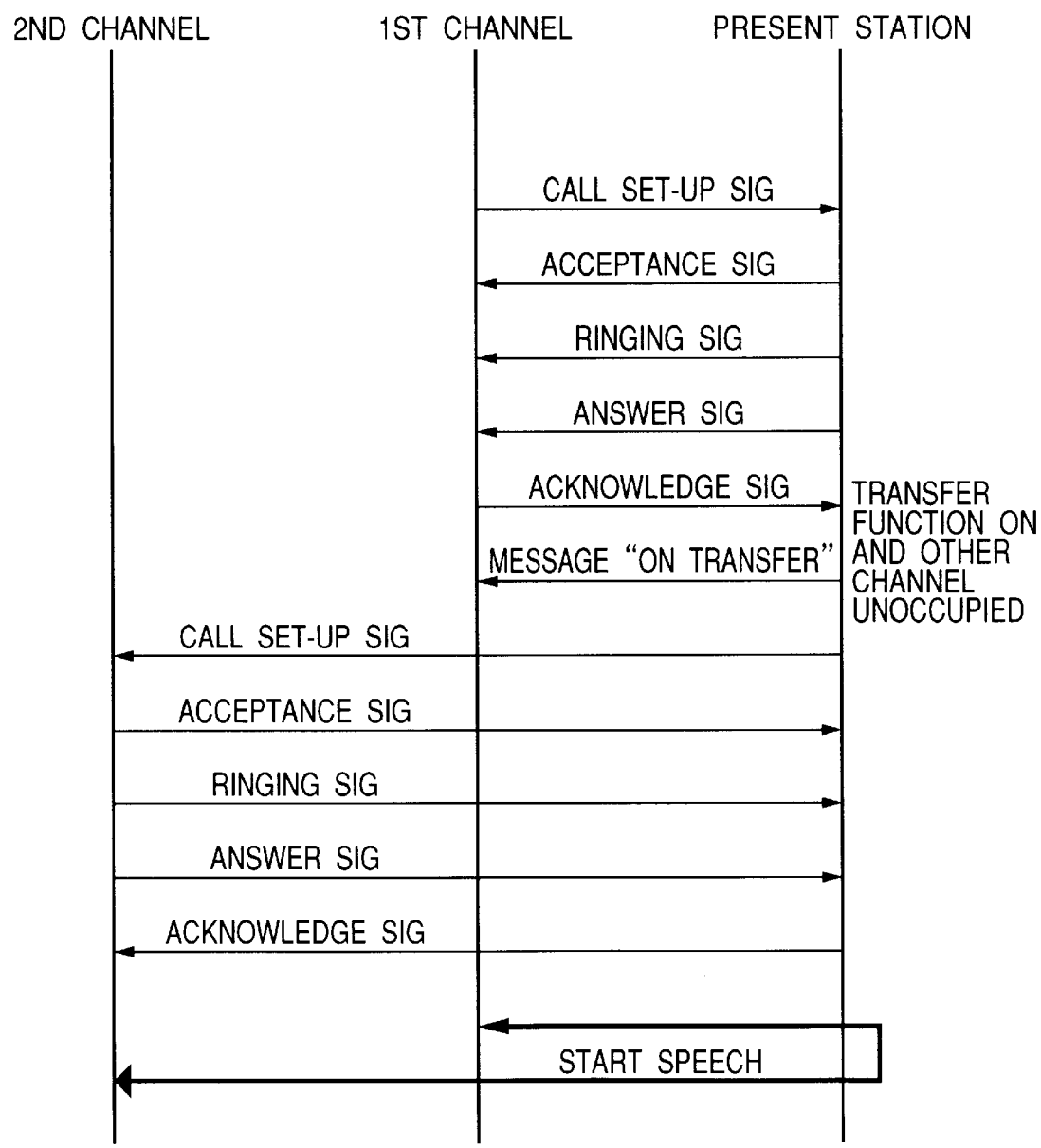
FIG. 4 is a sequence diagram showing the operation in the above embodiment.

FIG. 4 is a sequence diagram showing the operation in this case.

Since the call set-up from the first channel shown in FIG. 4 (the operation in a range from the call set-up to the transmission of the message indicating "on transfer" in FIG. 4) is similar to that in the status 1, its description is omitted here. When the call set-up of the first channel is acknowledged, the transfer is set, and the other channel (the second channel) is unoccupied (this discrimination is made by the means shown in the status 1), a call set-up signal is generated to the second channel by using the control channel. The call set-up acceptance signal and the ringing signal showing that the transfer station of the second channel can receive the call and is being rung, are received. An answer signal showing that the transfer station of the second channel answered the phone is received. Finally, an answer acknowledge signal showing that the answer has been accepted is generated to the control channel, so that the dialing/reception call to the second channel is established.

After that, the message indicating "on transfer" is erased. The suspending operation of the message indicating "on transfer" can be performed at the stage where the transfer station can accept the call, for example, at the stage where the call set-up acceptance signal is received.

In the communicating apparatus 100, the first and second channels are connected by the line interface 105 or the like and the first channel station (the transmitter station) and the second channel station (the transfer station) start a direct speech.

(Status 3: a case where although the other channel can be used and a message is transferred, the transfer station is busy)

If the other channel (the second channel) is unoccupied in step 6 in FIG. 2 and the transfer is set, dialing to the unoccupied channel is tried and a message for notifying the partner station of "on transfer" is generated by using the message transmission function (step 5). The transfer station is dialed (step 6).

If the transfer station is busy, however, the partner of the first channel is notified of a fact that the transfer station is busy (for example, a busy tone signal is transmitted). After that, if the reception of the specified signal from the partner station is detected in step 7, the message "on transfer" is erased (step 13). The transfer is suspended (the channel is released) (step 14). A message "transfer suspended" is sent (step 15). The answer/record function is started (step 16). The message is recorded (step 17).

When the specified signal is detected, a line signal of the partner station (speech channel signal on the first channel) is filtered by a filter corresponding to the specified signal and detected.

Figure 5:
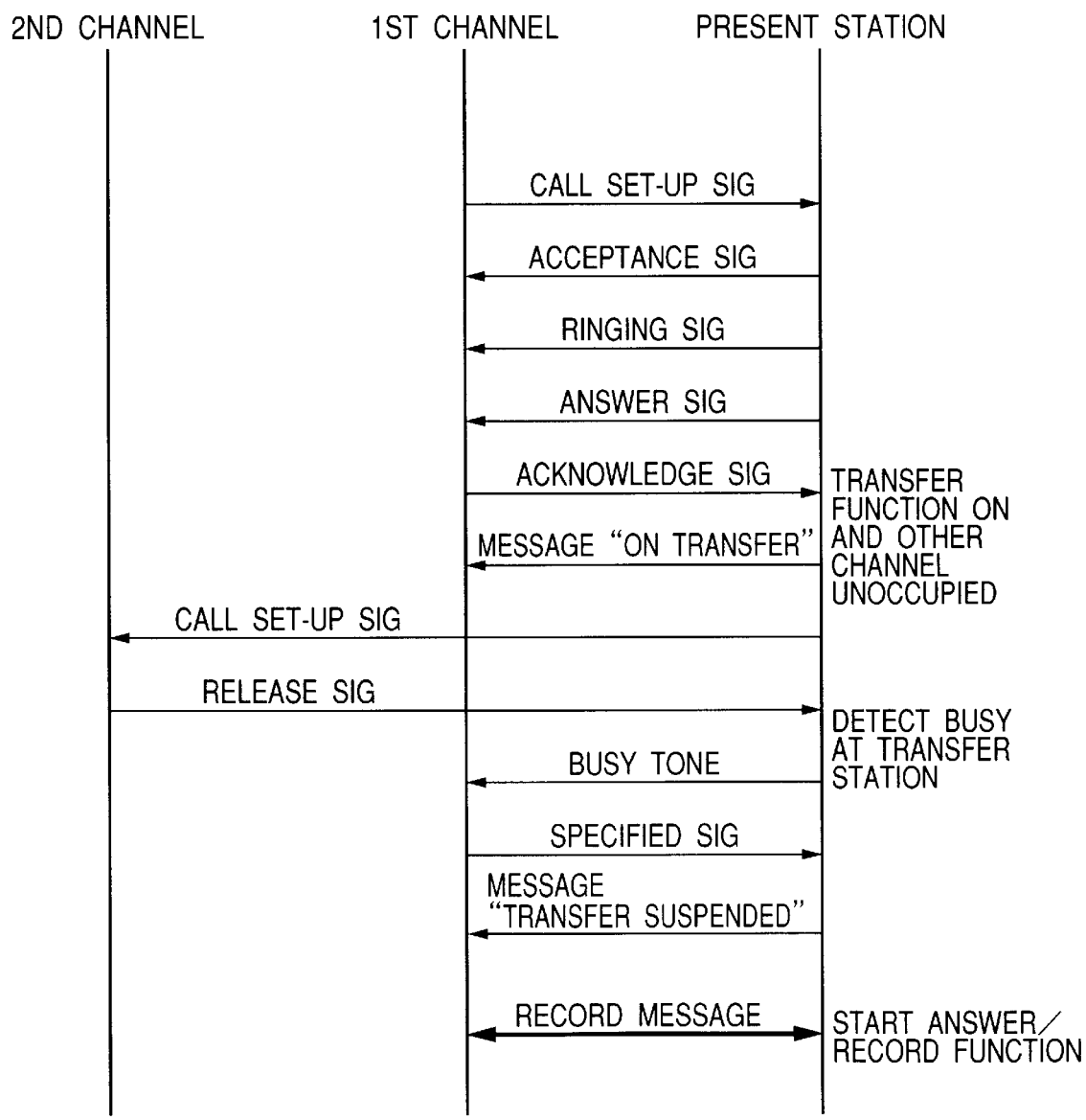
FIG. 5 is a sequence diagram showing the operation in the above embodiment.

FIG. 5 is a sequence diagram showing the operation in this case.

Since the set-up of the call from the first channel shown in FIG. 4 is similar to that in the status 1 or 2, its description is omitted here. When the set-up of the call of the first channel is acknowledged, the transfer is set, and the other channel (the second channel) is unoccupied (this discrimination is performed by the means shown in the status 1), the call set-up signal is generated to the second channel by using the control channel.

If the transfer station of the second channel cannot receive the call because the telephone is occupied, a release signal is received through the control channel. Thus, it is determined that the transfer station is busy. The message indicating "on transfer" to the partner station of the first channel is erased. A busy tone showing that the transfer station is busy is sent. When the specified signal from the partner station is detected here, the message "transfer suspended" showing that the transfer station is busy and the message cannot be transferred is sent. Subsequently, the answer/record function is started and the message is recorded.

(Status 4: a case where although the other channel can be used and a message is transferred, the transfer station cannot answer)

If the other channel is unoccupied in step 6 shown in FIG. 2 and the transfer is set, dialing to the unoccupied channel is tried and a message indicative of "on transfer" is sent to the partner station by using the message transmission function. However, if the transfer station is located at a place where the radio wave does not reach because of the cellular phone or the like, the message is transmitted from a fixed station.

The communicating apparatus 100 transmits the message from the fixed station to the partner station of the first channel. Actually, the operation for connecting the first and second channels and sending the message from the second channel to the first channel as it is is executed. A timing for connecting the first and second channels will be described hereinlater.

After that, if the reception of the specified signal from the partner station is detected in step 7, the message indicating "on transfer" is erased (step 13), the transfer is suspended (step 14), the message "transfer suspended" is sent (step 15), the answer/record function is started (step 16), and the message is recorded (step 17).

Figure 6:
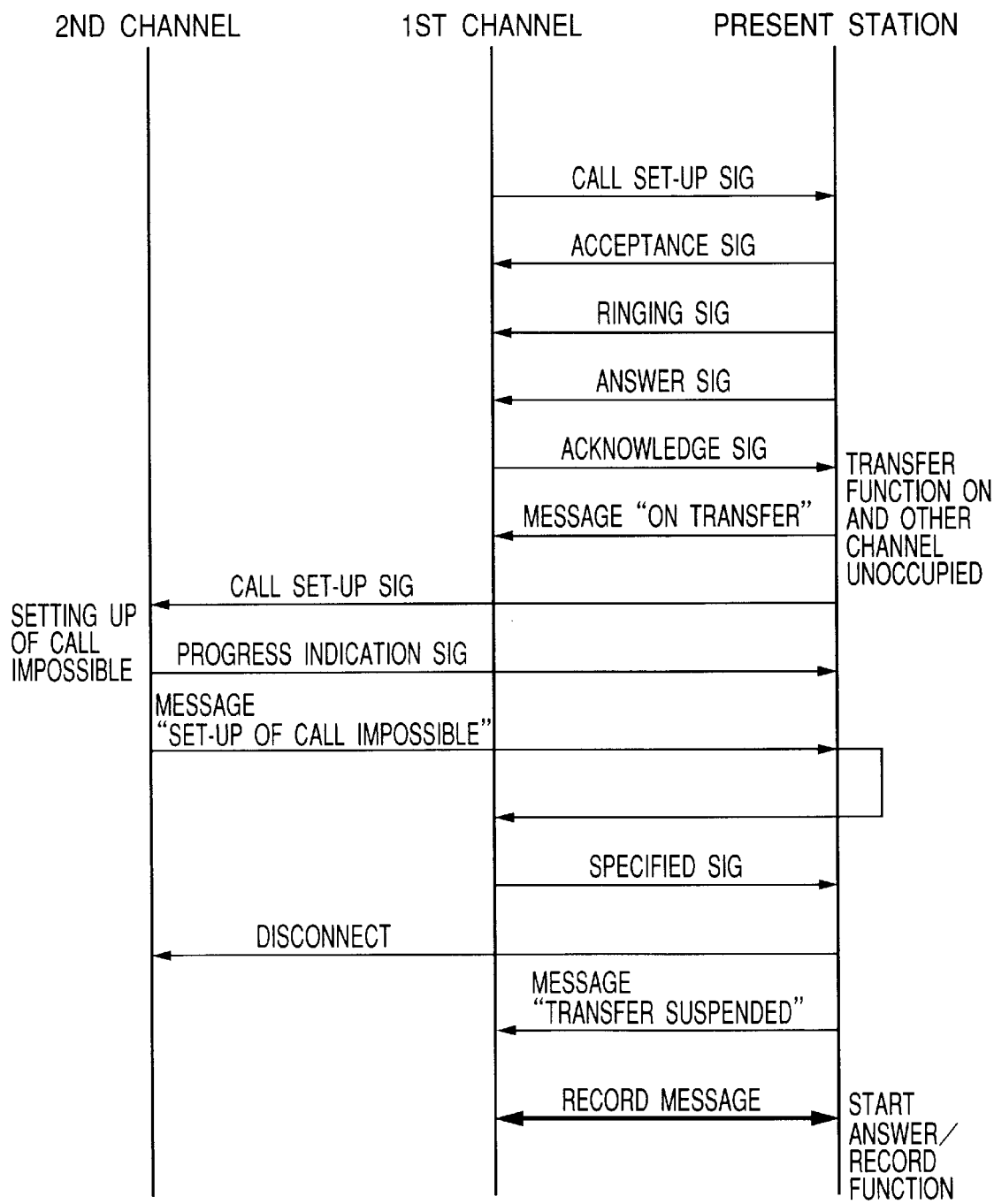
FIG. 6 is a sequence diagram showing the operation in the above embodiment.

FIG. 6 is a diagram showing a sequence in this case.

Since the set-up of call from the first channel shown in FIG. 6 is similar to that in the status 1 or 2, its description is omitted here. When the call set-up of the first channel is acknowledged, the transfer is set, and it is determined that the other channel (the second channel) is unoccupied (this discrimination is performed by the means shown in the status 1), a call set-up signal is generated to the second channel by using the control channel.

If the call set-up is impossible because the transfer station of the second channel is located at a place out of an area where the call can be received by the cellular phone or the like, a progress indication signal from the fixed station is received. By this signal, the communicating apparatus 100 connects the speech (data) channel to the line, waits for the message from the fixed station, and connects the first channel (the first data channel) and the second channel (the second data channel) in order to transmit the message from the fixed station to the partner station on the first channel. In this case, the erasure of the message indicating "on transfer" shown in FIG. 2 (step 13) is also performed at this timing.

Subsequently, a message "use impossible" to notify of a fact that the telephone of the transfer station cannot be used is received from the fixed station. This message is returned by the communicating apparatus 100 and sent to the partner station (the transmitter station) on the first channel. When the reception of the specified signal from the partner station is detected (step 7), the connected first and second channels are disconnected, a disconnection signal is sent to the second channel and the transfer to the second channel is suspended (step 14). Subsequently, the message "transfer suspended" to promote the recording of the message is sent (step 15), the answer/record function is started (step 16), and the message is recorded (step 17).

According to the invention, in the communicating apparatus which accommodates a plurality of channels, the apparatus is provided with the means for, when the transfer station is busy or the call cannot be set up, suspending the transfer, starting the answer message recording function of the communicating apparatus, and recording the message of the dialing partner side into the main body of the communicating apparatus. Therefore, even if the message cannot be transferred, there is an effect such that the message of the dialing person can be certainly recorded without wasting the dialing of the sender. Since the sender can select the recording of the message to the communicating apparatus, there is an effect such that the message can be recorded by a will of the sender and the wasteful message is not recorded.

What is claimed is:

1. A communicating apparatus having an answer/record function and is connected to a telephone line which accommodates a plurality of channels, comprising:

call transfer means for transferring a call;

call transfer setting means for setting a transfer of the call;

channel status detecting means for detecting a status of the channel;

specified signal receiving means for receiving a predetermined specified signal transmitted from a transmission partner side; and control means for controlling such that at the time of receiving the call, when a call transfer has been set by said call transfer setting means and when said channel status detecting means detects that the channel is an unoccupied channel, said call transfer setting means is allowed to transfer the call to a set transfer station by using the unoccupied channel and, if said specified signal receiving means detects the predetermined specified signal transmitted from the transmission partner side at this time, the transfer of the call by said call transfer setting means is suspended, and a message from the transmission partner side is recorded by the answer/record function of said communicating apparatus.

2. An apparatus according to claim 1, wherein the specified signal is a tone signal such as a DTMF or the like, and said specified signal receiving means is filtering means arranged to filter a reception signal.

* * * * *